(12) United States Patent
Tachibana et al.

(10) Patent No.: US 7,258,639 B2
(45) Date of Patent: Aug. 21, 2007

(54) FRICTIONAL FORCED POWER TRANSMISSION BELT AND BELT DRIVE SYSTEM WITH THE SAME

(75) Inventors: Hiroyuki Tachibana, Hyogo (JP); Hiroyuki Shiriike, Hyogo (JP)

(73) Assignee: Bando Chemical Industries, Ltd., Kobe-Shi (JP)

( * ) Notice: Subject to any disclaimer, the term of this patent is extended or adjusted under 35 U.S.C. 154(b) by 491 days.

(21) Appl. No.: 10/812,922

(22) Filed: Mar. 31, 2004

(65) Prior Publication Data

US 2004/0214674 A1    Oct. 28, 2004

(30) Foreign Application Priority Data

Apr. 25, 2003  (JP) .............................. 2003-122028

(51) Int. Cl.
*F16G 1/12* (2006.01)
(52) U.S. Cl. ...................................... 474/237
(58) Field of Classification Search ................ 474/237, 474/238, 260, 261, 265
See application file for complete search history.

(56) References Cited

U.S. PATENT DOCUMENTS

| | | | |
|---|---|---|---|
| 4,127,039 A * | 11/1978 | Hollaway, Jr. | 474/263 |
| 6,855,082 B2 * | 2/2005 | Moncrief et al. | 474/263 |
| 6,918,849 B2 * | 7/2005 | Gregg et al. | 474/263 |
| 2002/0042317 A1 * | 4/2002 | South | 474/264 |

FOREIGN PATENT DOCUMENTS

| | | | |
|---|---|---|---|
| JP | 07-063242 | | 3/1995 |
| JP | 2001317595 A | * | 11/2001 |
| JP | 2003-12871 | | 1/2003 |

* cited by examiner

*Primary Examiner*—Vicky A. Johnson
(74) *Attorney, Agent, or Firm*—Nixon Peabody LLP; Donald R. Studebaker

(57) ABSTRACT

A frictional forced power transmission belt transmits power to a pulley with its belt body wound around and in contact with the pulley. At least a contact part of the belt body with a pulley is formed of a rubber composition which contains ethylene-α-olefin elastomer as a rubber component but contains substantially no short fibers and which has a rubber hardness of not less than 80 but less than 95 when measured with a type A durometer in conformity with JIS K6253.

5 Claims, 7 Drawing Sheets

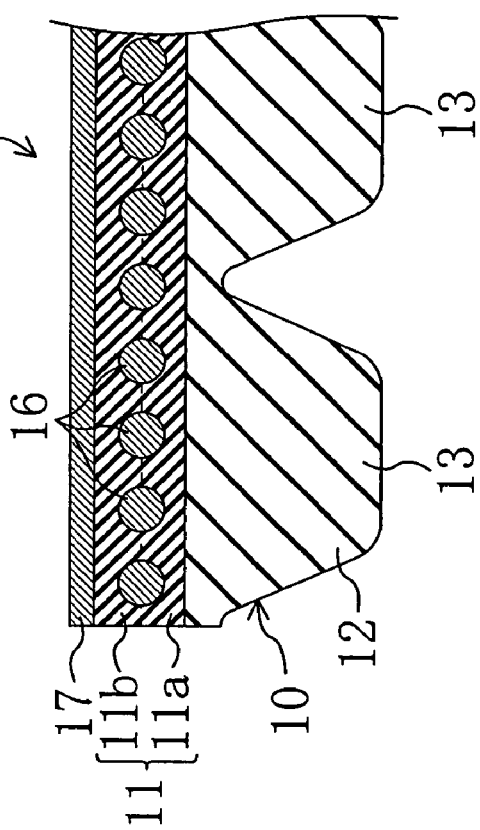
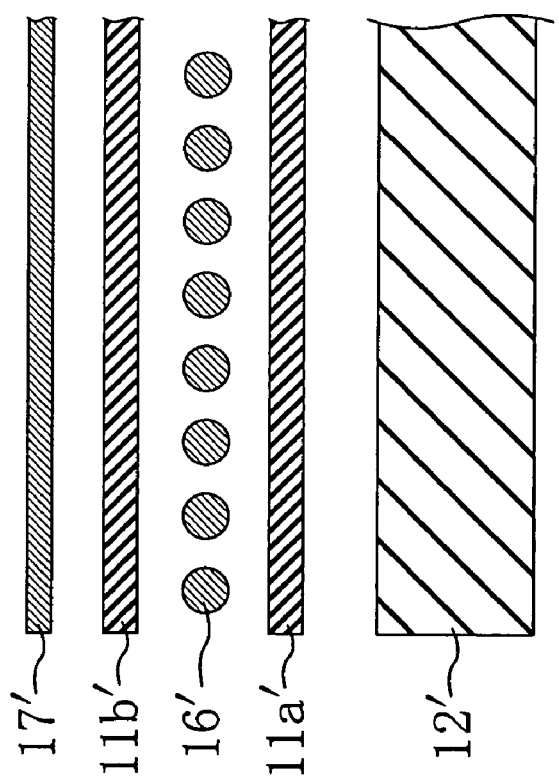

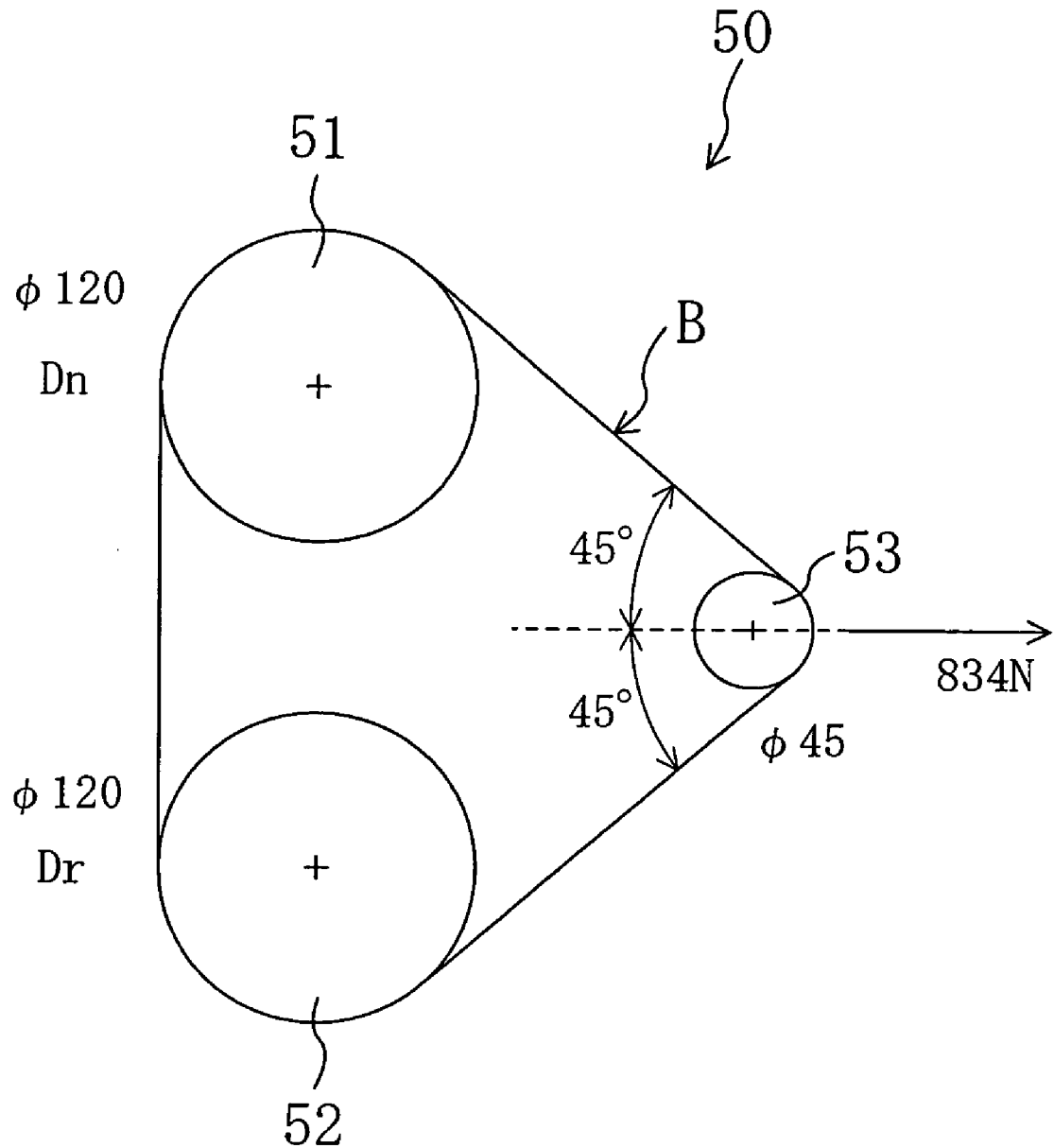

FIG. 6A

|  |  | Ex. 1 | Ex. 2 | Ex. 3 | Ex. 4 | Ex. 5 | Ex. 6 |
|---|---|---|---|---|---|---|---|
| EPDM (1) ethylene content: 58% | | 100 | | | | | 100 |
| EPDM (2) ethylene content: 60% | | | 100 | 100 | 100 | 100 | |
| EPDM (3) ethylene content: 69% | | | | | | | |
| EPDM (4) ethylene content: 74% | | | | | | | |
| EPDM (5) ethylene content: 75% | | | | | | | |
| CR | | | | | | | |
| Carbon black | HAF | 40 | 40 | 40 | 40 | 40 | 40 |
| | FEF | 35 | 35 | 40 | 60 | 100 | 60 |
| Softener | | 14 | 14 | 14 | 14 | 14 | 14 |
| Plasticizer | | | | | | | |
| Stearic acid | | 1 | 1 | 1 | 1 | 1 | 1 |
| Zinc oxide | | 5 | 5 | 5 | 5 | 5 | 5 |
| Antioxidant | | 3 | 3 | 3 | 3 | 3 | 3 |
| Organic peroxide | | | | | | | |
| MgO | | | | | | | |
| Vulcanization accelerator | | 4 | 4 | 4 | 4 | 4 | 4 |
| Sulphur | | 1.5 | 1.5 | 1.5 | 1.5 | 1.5 | 1.5 |
| Short fibers | | 25 | | | | | |
| Rubber hardness | | 85 | 78 | 80 | 89 | 95 | 87 |
| Sound pressure (dB) | | 68 | 91 | 72 | 70 | 68 | 67 |
| Belt flex life (hours) | | ≥1000 | ≥1000 | ≥1000 | 905 | 362 | ≥1000 |
| Abrasion loss (cm$^3$) | | 1.1 | 2.5 | 1.5 | 1.5 | 1.4 | 1.1 |

FIG. 6B

| | Ex. 7 | Ex. 8 | Ex. 9 | Ex.10 | Ex.11 |
|---|---|---|---|---|---|
| EPDM (1) ethylene content: 58% | | | | | |
| EPDM (2) ethylene content: 60% | | | | | |
| EPDM (3) ethylene content: 69% | 100 | | | 100 | |
| EPDM (4) ethylene content: 74% | | 100 | | | |
| EPDM (5) ethylene content: 75% | | | 100 | | |
| CR | | | | | 100 |
| Carbon black — HAF | 40 | 40 | 40 | 40 | 40 |
| Carbon black — FEF | 60 | 60 | 60 | 60 | 60 |
| Softener | 14 | 14 | 14 | 14 | |
| Plasticizer | | | | | 5 |
| Stearic acid | 1 | 1 | 1 | 1 | 1 |
| Zinc oxide | 5 | 5 | 5 | 5 | 5 |
| Antioxidant | 3 | 3 | 3 | 3 | 3 |
| Organic peroxide | | | | 2.5 | |
| MgO | | | | | 4 |
| Vulcanization accelerator | 4 | 4 | 4 | | |
| Sulphur | 1.5 | 1.5 | 1.5 | | |
| Short fibers | | | | | |
| Rubber hardness | 89 | 91 | 95 | 89 | 80 |
| Sound pressure (dB) | 65 | 63 | 63 | 62 | 87 |
| Belt flex life (hours) | ≥1000 | ≥1000 | 490 | ≥1000 | 520 |
| Abrasion loss (cm$^3$) | 1.1 | 1.0 | 0.9 | 0.9 | 2.3 |

FRICTIONAL FORCED POWER TRANSMISSION BELT AND BELT DRIVE SYSTEM WITH THE SAME

BACKGROUND OF THE INVENTION (a) Field of the Invention

This invention relates to frictional forced power transmission belts for transmitting power with their belt body wound around and in contact with a pulley, and relates to belt drive systems with the same.

(b) Description of the Related Art

Widespread use is made of serpentine belt drive systems for transmitting power from a crank shaft of an automotive engine to accessories such as a power steering, an air compressor and an alternator via a single V-ribbed belt in order to reduce the space for an engine room. Under these circumstances, such a V-ribbed belt is required to have a high power transmission capacity. In addition, the V-ribbed belt is also required to have a high noiselessness during belt run for the pursuit of a comfortable ride on a vehicle and other purposes. For these purposes, a typical V-ribbed belt is reinforced by short fibers mixed in a compression rubber layer that makes contact with pulleys so as to be oriented in a belt widthwise direction, and the short fibers protrude beyond the belt surface to reduce the coefficient of friction of the belt surface, resulting in reduced noise production and improved abrasion resistance.

Japanese Unexamined Patent Publication No. 7-63242 discloses a technique that a rib rubber layer of a V-ribbed belt made of hydrogenated acrylonitrile-butadiene rubber has a double-layered structure of a rib bottom and a rib top, short fibers are mixed into the hydrogenated acrylonitrile-butadiene rubber forming the rib bottom and oriented substantially in the belt widthwise direction, and unsaturated carboxylic acid's metal salt is compounded into the hydrogenated acrylonitrile-butadiene rubber forming the rib top. This publication describes that the above technique can provide a long-life V-ribbed belt that even in use under severe conditions such as rises in environmental temperature, has an excellent heat resistance, abrasion resistance and flexural fatigue resistance and does not cause any trouble such as malfunction due to abrasion.

Japanese Unexamined Patent Publication No. 2003-12871 discloses a V-ribbed belt formed of an elastic body layer including an adhesion rubber layer in which a cord is embedded along the belt lengthwise direction and a compression rubber layer, wherein out of the elastic body layer consisting of the adhesion rubber layer and the compression rubber layer, at least the compression rubber layer is made of a vulcanizate of an ethylene-α-olefin elastomer compound, the ethylene content of the ethylene-α-olefin elastomer is 60 to 75 mass %, one or more kinds of short fibers of 0.5 mm to 3 mm length are contained as reinforcing fibers in the compression rubber layer, and the total amount of addition of the short fibers is 10 to 30 parts by mass to 100 parts by mass of the ethylene-α-olefin elastomer. This publication describes that such a short fiber-containing rubber composition excellent in sheetability is used at least for the compression rubber layer, thereby providing a high-durability power transmission belt having excellent flexural fatigue resistance and heat resistance, cold resistance, abrasion resistance and sticking abrasion resistance.

The short fibers for use in V-ribbed belts are fabricated by cutting long fibers, and need to be subjected to adhesion treatment in order to be given adhesiveness to the rubber, resulting in high material unit cost. This is one of the factors of rise in the belt material cost.

V-ribbed belts are fabricated by applying heat and pressure to materials including an unvulcanized rubber sheet, a woven fabric and a cord wrapped or wound around a cylindrical mould. In this case, as the unvulcanized rubber sheet forming a rib rubber part of a belt body, use is made of an unvulcanized rubber sheet in which short fibers are oriented substantially perpendicularly with respect to the direction of wrapping around the cylindrical mould. Such an unvulcanized rubber sheet in which short fibers are oriented in a single direction is fabricated by extending a massive, unvulcanized rubber containing short fibers in a sheet form by a calender roll or the like. In the unvulcanized rubber sheet thus fabricated, short fibers are oriented in the longitudinal direction of the sheet. Therefore, in fabricating a V-ribbed belt, the elongated unvulcanized rubber sheet containing short fibers cannot be used as it is, i.e., with its longitudinal side aligned with the direction of wrapping around the mould, and needs to be used by cutting it to a slightly shorter length than that of the mould and wrapping it around the cylindrical mould with both cut edges coming to both sides of a row of V ribs. In this way, in fabricating a V-ribbed belt, the step of cutting a rolled unvulcanized rubber sheet containing short fibers is needed. This becomes a factor that raises the belt production cost.

SUMMARY OF THE INVENTION

An object of the present invention is to provide a frictional forced power transmission belt having an excellent noise reduction performance despite of no use of short fiber-containing rubber.

In order to achieve the above object, the present invention is directed to a frictional forced power transmission belt for transmitting power with a belt body thereof wound around and in contact with a pulley, wherein at least a contact part of the belt body with a pulley is formed of a rubber composition which contains ethylene-α-olefin elastomer as a rubber component but contains substantially no short fibers and which has a rubber hardness of not less than 80 but less than 95 when measured with a type A durometer in conformity with JIS K6253.

With the above structure, the rubber component of the rubber composition constituting the contact part of the belt body with the pulley is ethylene-α-olefin elastomer, and the rubber component itself has a low coefficient of friction and a high rubber hardness. Therefore, the belt surface has a low coefficient of friction and its rubbing sound when contacting the pulley can be reduced to a low level. As a result, the V-ribbed belt exhibits an excellent noise reduction performance despite of no use of short fiber-containing rubber.

Furthermore, since substantially no short fibers are mixed into the compression rubber layer, the material cost and production cost can be reduced to a low level.

If short fibers are mixed into the compression rubber layer, its rubber hardness becomes high and cracks may develop from the interfaces between the rubber and short fibers, thereby decreasing the belt life due to flex fatigue. In the present invention, however, the mixing of substantially no short fibers into the compression rubber layer allows the V-ribbed belt to exhibit an excellent flexural fatigue resistance despite of its high rubber hardness. Furthermore, since the rubber component of the rubber composition constituting the contact part of the belt body with the pulley is ethylene- α-olefin elastomer, the rubber component itself has a sufficient strength to construct a belt and an excellent flexural fatigue resistance.

In the frictional forced power transmission belt of the present invention, the ethylene-α-olefin elastomer preferably has an ethylene content less than 75%.

In the frictional forced power transmission belt of the present invention, the ethylene-α-olefin elastomer forming the belt body with the pulley is preferably cross-linked with an organic peroxide.

The frictional forced power transmission belt of the present invention is not particularly restricted so long as it is of the types that transmit power to a pulley with their belt body wound around and in contact with the pulley, such as raw edge V-belts and flat belts, but is especially suitable as a V-ribbed belt for use in automotive applications.

A belt drive system excellent in noise reduction performance can be constructed by a plurality of pulleys and a frictional forced power transmission belt of the present invention whose belt body is wound around and in contact with at least one of the plurality of pulleys.

BRIEF DESCRIPTION OF THE DRAWINGS

Further objects, features and advantages of the present invention will become apparent from the following description with reference to the accompanying drawings.

FIG. 2A illustrates construction materials of the V-ribbed belt, and FIG. 2B shows the entire structure of the V-ribbed belt.

FIG. 5 illustrates the layout of a belt run tester for belt durability test.

FIGS. 6A and 6B are tables showing the structures of test evaluation belts and test evaluation results.

DETAILED DESCRIPTION OF THE PREFERRED EMBODIMENTS

Hereinafter, embodiments of the present invention will be described in detail with reference to the drawings.

EMBODIMENT 1

Figure 1:
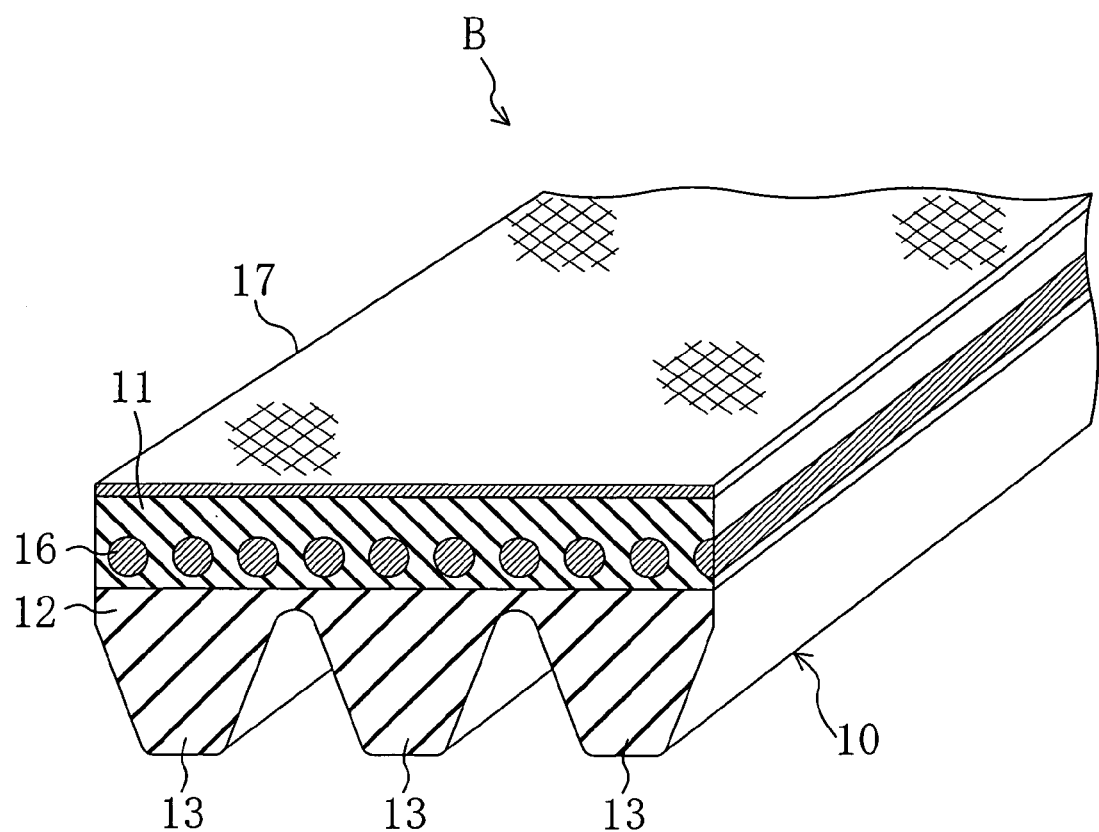
FIG. 1 is a perspective view of a V-ribbed belt according to a first embodiment of the present invention.

FIG. 1 illustrates a V-ribbed belt B according to a first embodiment of the present invention.

This V-ribbed belt B comprises a V-ribbed belt body 10, a cord 16 embedded in the V-ribbed belt body 10 to form a spiral at certain pitches in the belt widthwise direction, and a back face reinforcement fabric 17 provided to cover the back face side of the V-ribbed belt body 10.

The V-ribbed belt body 10 is made of a rubber composition in which ethylene-α-olefin elastomer such as ethylene-propylene-diene monomer rubber (EPDM) is contained at a content of ethylene of not less than 60% but less than 75% as a rubber component and the rubber component is cross-linked with an organic peroxide. The V-ribbed belt body 10 has a structure in which an adhesion rubber layer 11 having the cord 16 embedded therein and an underlying compression rubber layer 12 are stacked into one piece. The compression rubber layer 12 serves as a part for making contact with a pulley located internally of the belt and transmitting power directly to the pulley. Therefore, in order to ensure that the belt has a wide contact area with the pulley, the compression rubber layer 12 is provided with ridge-like ribs 13 that extend in the belt lengthwise direction and are aligned in the belt widthwise direction. Furthermore, unlike the known V-ribbed belts, substantially no short fibers are mixed into the compression rubber layer 12. The compression rubber layer 12 has a rubber hardness of not less than 80 but less than 95 when measured with a type A durometer in conformity with JIS K6253.

The cord 16 is formed of twisted yarns of aramid fibers, polyester fibers or the like. In order to provide the cord 16 with adhesiveness to the V-ribbed belt body 10, the cord 16 is subjected, before moulding, to a series of treatments of soaking into a resorcinol-formaldehyde latex water solution (hereinafter, referred to as an RFL water solution) and heat application and a series of treatments of soaking into rubber cement and drying.

The back face reinforcement fabric 17 is formed of a woven fabric such as a plain weave fabric consisting of warp and weft yarns. In order to provide the back face reinforcement fabric 17 with adhesiveness to the V-ribbed belt body 10, the fabric 17 is subjected, before moulding, to a series of treatments of soaking into an RFL water solution and heat application and a series of treatments of rubber cement coating on its surface to be in contact with V-ribbed belt body 10 and drying.

In the V-ribbed belt B having the above structure, since the rubber composition constituting the compression rubber layer 12, which is a contact part of the V-ribbed belt body 10 with the pulley, has a high rubber hardness, the belt surface has a low coefficient of friction. In addition, since the rubber component of the rubber composition constituting the compression rubber layer 12 is ethylene-α-olefin elastomer having a low coefficient of friction, the rubbing sound of the V-ribbed belt B on the pulley can be reduced to a low level. Therefore, the V-ribbed belt B exhibits a very excellent noise reduction performance despite of no use of short fiber-containing rubber.

Furthermore, since substantially no short fibers are mixed into the compression rubber layer 12, the material cost and production cost can be reduced to a low level.

If short fibers are mixed into the compression rubber layer 12, the rubber hardness becomes high and cracks may develop from the interfaces between the rubber and short fibers, thereby decreasing the belt life due to flex fatigue. In this embodiment, however, the non-mixing of short fibers into the compression rubber layer 12 allows the V-ribbed belt B to exhibit an excellent flexural fatigue resistance despite of its high rubber hardness. The contributing factor to this benefit is that the rubber component of the rubber composition constituting the compression rubber layer 12 is ethylene-α-olefin elastomer and that the rubber component itself has a sufficient strength to construct a belt and an excellent flexural fatigue resistance.

Next, description will be made of a method for producing a V-ribbed belt B having the above structure with reference to FIGS. 2A and AB.

The production of a V-ribbed belt B is made using an inner mould whose outer periphery has a moulding surface for forming the belt back face into a predetermined shape and a rubber sleeve whose inner periphery has a moulding surface for forming the belt inner face into a predetermined shape.

First, the outer periphery of the inner mould is covered with a woven fabric 17' which will be a back face reinforcement fabric 17, and an uncross-linked rubber sheet 11b' for forming a back face side portion 11b of an adhesion rubber layer 11 is then wrapped around the fabric 17'.

Consequently, a twisted yarn 16' which will be a cord 16 is wound spirally around the rubber sheet 11b', an uncross-linked rubber sheet 11a' for forming an inner face side portion 11a of the adhesion rubber layer 11 is then wrapped around the yarn-wound rubber sheet 11b', and an uncross-linked rubber sheet 12' for forming a compression rubber layer 12 is then wrapped around the rubber sheet 11a'. In this connection, an uncross-linked rubber sheet mixed with short fibers is not used as the uncross-linked rubber sheet 12' for forming a compression rubber layer 12. Therefore, an elongated unvulcanized rubber sheet obtained by extending a massive, unvulcanized rubber in a sheet form by a calender roll or the like is used as the uncross-linked rubber sheet 12' as it is, i.e., with its lengthwise side aligned with the direction of wrapping around the mould. In wrapping each of the uncross-linked rubber sheets 11b', 11a' and 12', its ends in the wrapping direction are not overlapped with but butted on each other.

Thereafter, the rubber sleeve is fitted on the moulded piece around the inner mould, they are set in a moulding oven, and the rubber sleeve is then radially inwardly pressed against the inner mould with a high pressure while the inner mould is being heated by high-temperature steam or the like. During the time, the rubber component is fluidized and concurrently a cross-linking reaction progresses, so that adhesion reactions of the twisted yarn 16' and woven fabric 17' on the rubber progress. As a result, a cylindrical belt slab is formed.

Then, the belt slab is removed from the inner mould and sectioned into plural portions in its lengthwise direction. Thereafter, the outer periphery of each portion is ground to form ribs 13.

Finally, the belt slab sectioned into plural portions and having ribs 13 formed on the outer periphery is sliced into pieces having a predetermined width, and each piece is reversed thereby obtaining a V-ribbed belt B.

Figure 3:
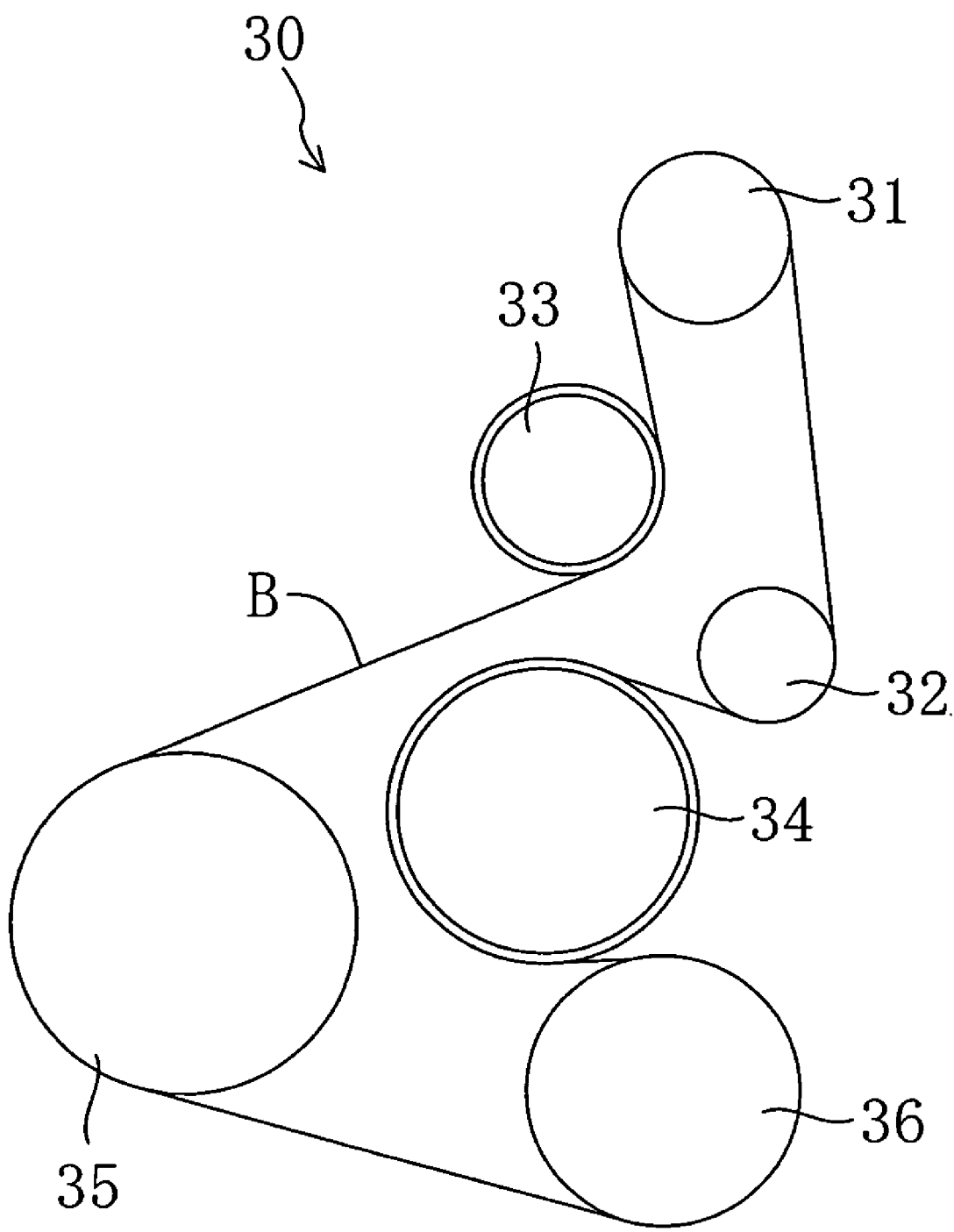
FIG. 3 illustrates the layout of a belt drive system for driving automotive accessories according to the first embodiment.

FIG. 3 shows the layout of an accessory belt drive system 30 of the serpentine drive type in an automotive engine using the V-ribbed belt B.

This layout of the accessory belt drive system 30 is formed by a power steering pulley 31 located at an uppermost position, an AC generator pulley 32 placed below the power steering pulley 31, a flat tensioner pulley 33 placed to the lower left of the power steering pulley 31, a flat water pump pulley 34 placed below the tensioner pulley 33, a crank shaft pulley 35 placed to the lower left of the tensioner pulley 33, and an air conditioner pulley 36 placed to the lower right of the crank shaft pulley 35. Among these pulleys, those other than the tensioner pulley 33 and the water pump pulley 34, which are flat pulleys, are all ribbed pulleys. The V-ribbed belt B is wound around the power steering pulley 31 to make contact at its ribs 13, then the tensioner pulley 33 to make contact at its back face, then sequentially the crank shaft pulley 35 and the air conditioner pulley 36 to make contact at its ribs 13, then the water pump pulley 34 to make contact at its back face, then the AC generator pulley 32 to make contact at its ribs 13, and finally returns to the power steering pulley 31.

Since the accessory belt drive system 30 uses a V-ribbed belt B according to the present invention, it exhibits a very excellent noise reduction performance.

EMBODIMENT 2

Figure 4:
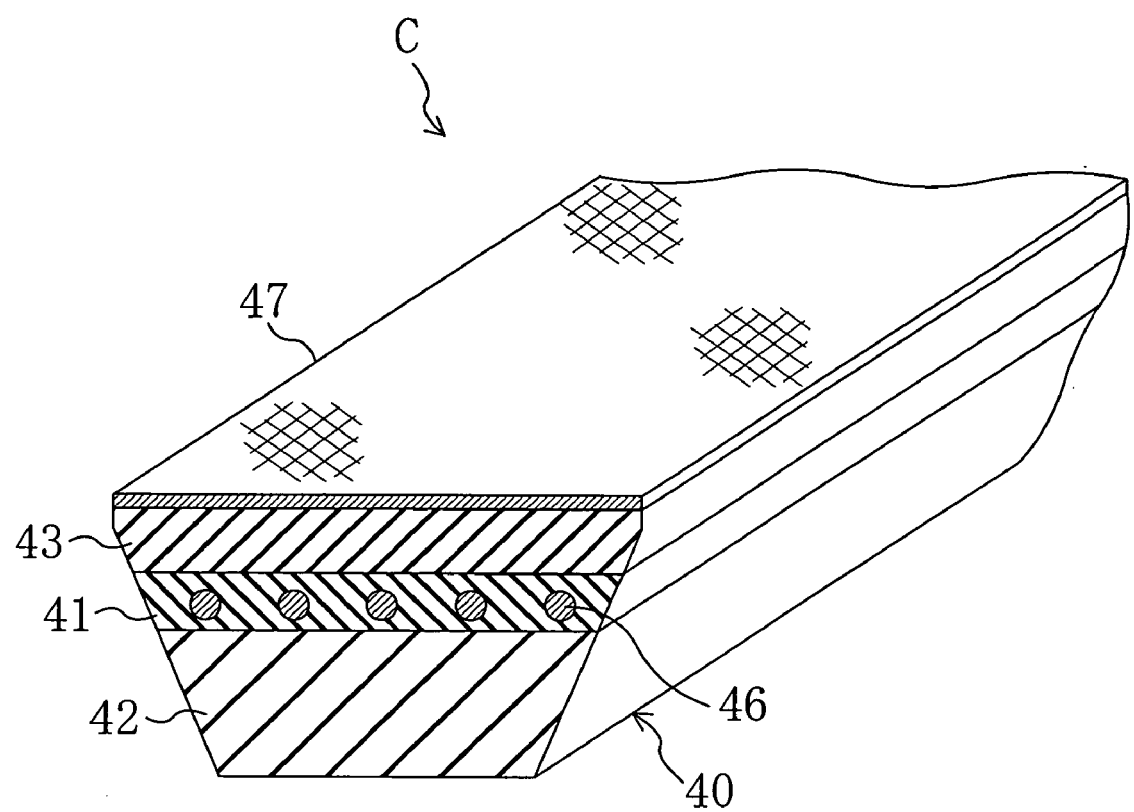
FIG. 4 is a perspective view of a V-belt according to a second embodiment of the present invention.

FIG. 4 shows a raw edge V-belt C according to a second embodiment of the present invention.

This V-belt C comprises a V-belt body 40, a cord 46 embedded in the V-belt body 40 to form a spiral at certain pitches in the belt widthwise direction, and a back face reinforcement fabric 47 provided to cover the back face side of the V-belt body 40.

The V-belt body 40 is made of a rubber composition in which ethylene-α-olefin elastomer such as ethylene-propylene-diene monomer rubber (EPDM) is contained at a content of ethylene of not less than 60% but less than 75% as a rubber component and the rubber component is cross-linked with an organic peroxide. The V-belt body 40 has a structure in which an adhesion rubber layer 41 having the cord 46 embedded therein, a compression rubber layer 42 underlying the adhesion rubber layer 41 and a tension rubber layer 43 overlying the adhesion rubber layer 41 are stacked into one piece. Furthermore, unlike the known V-belts, substantially no short fibers are mixed into the compression rubber layer 42. The compression rubber layer 42 has a rubber hardness of not less than 80 but less than 95 when measured with a type A durometer in conformity with JIS K6253.

The cord 46 is formed of twisted yarns of aramid fibers, polyester fibers or the like. In order to provide the cord 46 with adhesiveness to the V-belt body 40, the cord 46 is subjected, before moulding, to a series of treatments of soaking into an RFL water solution and heat application and a series of treatments of soaking into rubber cement and drying.

The back face reinforcement fabric 47 is formed of a woven fabric such as a plain weave fabric consisting of warp and weft yarns. In order to provide the back face reinforcement fabric 47 with adhesiveness to the V-belt body 40, the fabric 47 is subjected, before moulding, to a series of treatments of soaking into an RFL water solution and heat application and a series of treatments of rubber cement coating on its surface to be in contact with V-belt body 40 and drying.

In the V-belt C having the above structure, since the rubber composition constituting the compression rubber layer 42, which is a contact part of the V-belt body 40 with the pulley, has a high rubber hardness, the belt surface has a low coefficient of friction. In addition, since the rubber component of the rubber composition constituting the compression rubber layer 42 is ethylene-α-olefin elastomer having a low coefficient of friction, the rubbing sound of the V-belt C on the pulley can be reduced to a low level. Therefore, the V-belt C exhibits a very excellent noise reduction performance despite of no use of short fiber-containing rubber.

Furthermore, since substantially no short fibers are mixed into the compression rubber layer 42, the material cost and production cost can be reduced to a low level.

OTHER EMBODIMENTS

Although a frictional forced power transmission belt of the present invention has been described as a V-ribbed belt B in the first embodiment and a raw edge V-belt C in the second embodiment, it is not restrictive to these types but can be of other types such as other types of V-belts or flat belts.

Although in the first and second embodiments the rubber composition constituting the belt body 10 or 40 is obtained by cross-linking ethylene-α-olefin elastomer with an organic peroxide, this is not restrictive but a rubber composition obtained by cross-linking ethylene-α-olefin elastomer with sulphur can be used.

Hereinafter, description will be made of test evaluations on V-ribbed belts.

Test Evaluation Belt

V-ribbed belts shown in the following Examples 1 to 11 were prepared. Their structures are also shown in FIGS. 6A and 6B.

EXAMPLE 1

As Example 1, a V-ribbed belt was prepared which has the same structure as in the first embodiment and in which the compression rubber layer is formed of a rubber composition obtained by using EPDM with an ethylene content of 58% as its basic rubber component and compounding 100 parts by mass of the EPDM with 75 parts by mass of carbon black (HAF: 40 parts by mass, FEF: 35 parts by mass), 14 parts by mass of paraffin oil as a softener, 1 part by mass of stearic acid, 5 parts by mass of zinc oxide, 3 parts by mass of antioxidant, 1.5 parts by mass of sulphur as a cross-linking agent, 4 parts by mass of vulcanization accelerator, and 25 parts by mass of short nylon fibers of 1 mm length. The rubber hardness of the compression rubber layer measured with a type A durometer in conformity with JIS K6253 was 85. The adhesion rubber layer was also formed of a rubber composition containing EPDM as its basic rubber component.

EXAMPLE 2

As Example 2, a V-ribbed belt was prepared which has the same structure as in the first embodiment and in which the compression rubber layer is formed of a rubber composition obtained by using EPDM with an ethylene content of 60% as its basic rubber component and compounding 100 parts by mass of the EPDM with 75 parts by mass of carbon black (HAF: 40 parts by mass, FEF: 35 parts by mass), 14 parts by mass of paraffin oil as a softener, 1 part by mass of stearic acid, 5 parts by mass of zinc oxide, 3 parts by mass of antioxidant, 1.5 parts by mass of sulphur as a cross-linking agent, and 4 parts by mass of vulcanization accelerator. The rubber hardness of the compression rubber layer was 78. The adhesion rubber layer was also formed of a rubber composition containing EPDM as its basic rubber component.

EXAMPLE 3

As Example 3, a V-ribbed belt was prepared which has the same structure as in Example 2 except that the content of FEF in carbon black was 40 parts by mass. The rubber hardness of the compression rubber layer was 80.

EXAMPLE 4

As Example 4, a V-ribbed belt was prepared which has the same structure as in Example 2 except that the content of FEF in carbon black was 60 parts by mass. The rubber hardness of the compression rubber layer was 89.

EXAMPLE 5

As Example 5, a V-ribbed belt was prepared which has the same structure as in Example 2 except that the content of FEF in carbon black was 100 parts by mass. The rubber hardness of the compression rubber layer was 95.

EXAMPLE 6

As Example 6, a V-ribbed belt was prepared which has the same structure as in Example 4 except that EPDM with an ethylene content of 58% was used as a basic rubber component of the rubber composition constituting the compression rubber layer. The rubber hardness of the compression rubber layer was 87.

EXAMPLE 7

As Example 7, a V-ribbed belt was prepared which has the same structure as in Example 4 except that EPDM with an ethylene content of 69% was used as a basic rubber component of the rubber composition constituting the compression rubber layer. The rubber hardness of the compression rubber layer was 89.

EXAMPLE 8

As Example 8, a V-ribbed belt was prepared which has the same structure as in Example 4 except that EPDM with an ethylene content of 74% was used as a basic rubber component of the rubber composition constituting the compression rubber layer. The rubber hardness of the compression rubber layer was 91.

EXAMPLE 9

As Example 9, a V-ribbed belt was prepared which has the same structure as in Example 4 except that EPDM with an ethylene content of 75% was used as a basic rubber component of the rubber composition constituting the compression rubber layer. The rubber hardness of the compression rubber layer was 95.

EXAMPLE 10

As Example 10, a V-ribbed belt was prepared which has the same structure as in Example 7 except that instead of sulphur and vulcanization accelerator, 2.5 parts by mass of organic peroxide acting as a cross-linking agent was compounded into the rubber composition constituting the compression rubber layer. The rubber hardness of the compression rubber layer was 89.

EXAMPLE 11

As Example 11, a V-ribbed belt was prepared which has the same structure as in the first embodiment and in which the compression rubber layer is formed of a rubber composition obtained by using chloroprene rubber (CR) as its basic rubber component and compounding 100 parts by mass of CR with 100 parts by mass of carbon black (HAF: 40 parts by mass, FEF: 60 parts by mass), 5 parts by mass of sebacic acid derivative as a plasticizer, 1 part by mass of stearic acid, 5 parts by mass of zinc oxide, 3 parts by mass of antioxidant, and 4 parts by mass of magnesium oxide. The rubber hardness of the compression rubber layer was 80. The adhesion rubber layer was also formed of a rubber composition containing CR as its basic rubber component.

Test Evaluation Method

<Belt Flex Life>

FIG. 5 shows the layout of a belt run tester 50 for durability evaluation of V-ribbed belts B. This belt run tester 50 comprises large-diameter ribbed pulleys 51 and 52 of 120 mm pulley diameter disposed one above the other (the upper is a driven pulley and the lower is a drive pulley), and a small-diameter ribbed pulley 53 of 45 mm pulley diameter disposed rightward of and at a height intermediate the large-diameter ribbed pulleys. The small-diameter ribbed pulley 53 is positioned to form a belt winding angle of 90°.

A belt run test was conducted on each of the V-ribbed belts B of the above Examples 1 to 11 by winding each belt around the three ribbed pulleys 51 to 53, pulling the small-diameter ribbed pulley 53 laterally to impose a load on it by a set weight of 834N, and rotating the lower ribbed pulley 52, which is a drive pulley, at 4900 rpm in an atmosphere of 23° C. Under these conditions, the time from the start of the run until the failure of the belt was measured as a belt flex life.

<Amount of Abrasion Loss>

For each of the V-ribbed belts of Examples 1 to 11, the mass of the belt after 100 hours run in the above belt run test was measured and compared with that of the same belt before the belt run test, thereby calculating the amount of abrasion loss in terms of volume.

<Sound Pressure>

For each of the V-ribbed belts of Examples 1 to 11, the slip sound of the belt was measured after 300 hours run in the above belt run test.

Test Evaluation Results

The test results are shown in FIGS. 6A and 6B. In regard to evaluation, Example 1 in which the compression rubber layer is formed of short fiber-containing rubber can be a criterion as a standard of known arts.

Referring to FIGS. 6A and 6B, comparisons among Examples 2 to 5, which are different in the content of FEF in carbon black, show that a greater content of FEF leads to a higher rubber hardness, Example 2 with a rubber hardness of 78 is equivalent in belt flex life to but has a higher sound pressure and greater abrasion loss than Example 1, and Example 5 with a rubber hardness of 95 has a lower sound pressure and smaller abrasion loss than Example 2 but has an extremely short belt flex life. The reason for these results is considered to be that while a lower rubber hardness leads to a higher coefficient of friction at the belt surface and in turn a larger rubbing sound of the belt on the pulley, a higher rubber hardness leads to a lower flexural resistance of the belt body. Example 3 with a rubber hardness of 80 and Example 4 with a rubber hardness of 89 are equivalent in sound pressure to Example 1, smaller in abrasion loss than Example 2 and at the same level in belt flex life as Example 1.

Comparisons among Example 4 and Examples 6 to 9, which are different in the ethylene content in EPDM, show that a greater ethylene content leads to a higher rubber hardness, Example 8 with an ethylene content of 74% has a rubber hardness of 91 and a longer belt flex life, lower sound pressure and smaller abrasion loss than Example 1, and Example 9 with an ethylene content of 75% has a rubber hardness of 95 and a lower sound pressure and smaller abrasion loss than Example 1 but has an extremely short belt flex life.

According to the above results, it is considered that in order to obtain a V-ribbed belt having an excellent noise reduction performance and belt flex resistance, a suitable rubber hardness of the compression rubber layer is not less than 80 but less than 95. On the other hand, though a suitable ethylene content thereof depends upon the composition of rubber being used, it is considered from the above results that an ethylene content less than 75% is preferable.

A comparison between Examples 7 and 10 using different cross-linking agents shows that Example 7 using sulphur as a cross-linking agent is equivalent in belt flex life to Example 10 using an organic peroxide as a cross-linking agent, but the latter has a lower sound pressure and smaller abrasion loss than the former. Therefore, it is considered that in order to obtain a V-ribbed belt exhibiting an excellent noise reduction performance, organic peroxide-based cross-linking agents are preferable to sulphur-based cross-linking agents.

Example 11, which uses CR as a rubber component of the compression rubber layer, is lower in rubber hardness, higher in sound pressure, shorter in belt flex life and greater in abrasion loss than Example 1. These results shows that when the compression rubber layer is formed of CR containing no short fibers, a V-ribbed belt excellent in noise reduction performance and other necessary properties cannot be obtained.

The foregoing discloses and describes merely exemplary embodiments of the present invention. One skilled in the art will readily recognize, from such discussion and accompanying drawings and claims, that various changes, modifications and variations can be made therein without departing from the spirit and scope of the present invention.

What is claimed is:

1. A frictional forced power transmission belt for transmitting power with a belt body thereof wound around and in contact with a pulley,
   wherein at least a contact part of the belt body with a pulley is formed of a rubber composition which contains ethylene-α-olefin elastomer as a rubber component but contains substantially no short fibers and which has a rubber hardness of not less than 80 but less than 95 when measured with a type A durometer in conformity with JIS K6253.

2. The frictional forced power transmission belt of claim 1, wherein the ethylene-α-olefin elastomer has an ethylene content less than 75%.

3. The frictional forced power transmission belt of claim 1, wherein the ethylene-α-olefin elastomer forming the belt body is cross-linked with an organic peroxide.

4. The frictional forced power transmission belt of claim 1, wherein the belt body is a V-ribbed belt body.

5. A belt drive system comprising:
   a plurality of pulleys; and
   a frictional forced power transmission belt whose belt body is wound around and in contact with at least one of the plurality of pulleys,
   wherein at least a contact part of the belt body with the pulley is formed of a rubber composition which contains ethylene-α-olefin elastomer as a rubber component but contains substantially no short fibers and which has a rubber hardness of not less than 80 but less than 95 when measured with a type A durometer in conformity with JIS K6253.

* * * * *